(12) United States Patent  (10) Patent No.: US 8,686,607 B2
Elender et al.  (45) Date of Patent: Apr. 1, 2014

(54) ELECTRICAL MOTOR HAVING RADIALLY OFFSET COOLING STREAM AND COOLING METHOD

(75) Inventors: Gunther Elender, Fürstenzell (DE); Oliver Memminger, Neuburg A.D. Inn (DE); Norbert Schönbauer, Bad Füssing (DE); Karl Senninger, Egglham (DE)

(73) Assignee: Siemens Aktiengesellschaft, München (DE)

( * ) Notice: Subject to any disclaimer, the term of this patent is extended or adjusted under 35 U.S.C. 154(b) by 181 days.

(21) Appl. No.: 13/141,484

(22) PCT Filed: Nov. 24, 2009

(86) PCT No.: PCT/EP2009/065717
§ 371 (c)(1),
(2), (4) Date: Jun. 22, 2011

(87) PCT Pub. No.: WO2010/072496
PCT Pub. Date: Jul. 1, 2010

(65) Prior Publication Data
US 2011/0254391 A1  Oct. 20, 2011

(30) Foreign Application Priority Data
Dec. 23, 2008 (DE) .......................... 10 2008 064 498

(51) Int. Cl.
*H02K 9/00* (2006.01)
(52) U.S. Cl.
USPC .................. 310/59; 310/52; 310/58; 310/60 A

(58) Field of Classification Search
USPC ................................ 310/51, 52, 58, 59, 60 A
See application file for complete search history.

(56) References Cited

U.S. PATENT DOCUMENTS 3,684,906 A  8/1972  Lenz
4,301,386 A  11/1981  Lenz
(Continued)

FOREIGN PATENT DOCUMENTS

CN  1289167 A  3/2001
CN  1627600 A  6/2005
(Continued)

OTHER PUBLICATIONS

Machine Translation JP2008228523(2008) and JP2003274618(2003).*

*Primary Examiner* — Tran Nguyen
*Assistant Examiner* — Jose Gonzalez Quinones
(74) *Attorney, Agent, or Firm* — Henry M. Feiereisen LLC

(57) ABSTRACT

The rotor of an electrical motor should be designed simply and able to be efficiently cooled. To this end, the invention relates to an electrical motor having a rotor that has at least one radial cooling slot (16) and axially running cooling channels. The first cooling channels (18) run having their central axis at a different radial height opposite the axis of the rotor (11) than the second cooling channels (19). A spacer (29) is arranged in the at least one radial cooling slot (16) by means of which a first cooling stream (28) can be conducted from one of the first cooling channels (18) into one of the second cooling channels (19). A second partial package (T2) in the flow direction can also be supplied with cool air in this way if it flows through the first partial package (T1) in a cool region, such as near the shaft.

7 Claims, 3 Drawing Sheets

(56) References Cited

U.S. PATENT DOCUMENTS

| | | |
|---|---|---|
| 4,395,816 A | 8/1983 | Pangburn |
| 6,087,745 A | 7/2000 | Dreher |
| 6,459,180 B1 | 10/2002 | Mori |
| 2005/0121990 A1* | 6/2005 | Kaneko .................... 310/156.47 |

FOREIGN PATENT DOCUMENTS

| | | |
|---|---|---|
| CN | 1836359 A | 9/2006 |
| DE | 2834988 A1 | 3/1979 |
| DE | 29913314 U1 | 10/1999 |
| DE | 10052427 A1 | 5/2002 |
| DE | 10107298 01 | 7/2002 |
| JP | 58215954 A | 12/1983 |
| JP | 2003274618 A * | 9/2003 |
| JP | 2008228523 A * | 9/2008 |
| RU | 2258295 C2 | 8/2005 |
| SU | 1718340 A1 | 3/1992 |
| WO | WO 9739513 A1 | 10/1997 |
| WO | WO 0235687 A1 | 5/2002 |
| WO | WO 2005013459 A1 | 2/2005 |

* cited by examiner

ELECTRICAL MOTOR HAVING RADIALLY OFFSET COOLING STREAM AND COOLING METHOD

CROSS-REFERENCES TO RELATED APPLICATIONS

This application is the U.S. National Stage of International Application No. PCT/EP2009/065717, filed Nov. 24, 2009, which designated the United States and has been published as International Publication No. WO 2010/072496 A2 and which claims the priority of German Patent Application, Serial No. 10 2008 064 498.6, filed Dec. 23, 2008, pursuant to 35 U.S.C. 119(a)-(d).

BACKGROUND OF THE INVENTION

The present invention relates to an electrical machine having a rotor which has at least one radial cooling slot and axially running cooling ducts which issue into the at least one radial cooling slot in said rotor. The present invention also relates to a method for cooling an electrical machine having a rotor by cooling the rotor with a cooling stream which is introduced axially into the rotor.

In principle, it is necessary to supply uniformly cool air (or cooling agent) to the rotor of an electrical machine. At the same time, it should be possible to encapsulate the magnet pockets for protecting the magnets against corrosion and movement without a great amount of work.

A type of synchronous machine with permanent magnet excitation and only one core element has been built to date. This has the advantage that the stator in the central region cannot be supplied with a sufficient amount of cooling air. In addition, the rotor is only non-uniformly cooled when the stream of cooling agent floods in. In the case of another type of synchronous machine with permanent magnet excitation, the magnets were fixed (for example by adhesive bonding) on individual core elements. Although more uniform cooling was achieved in this case, it is very complicated to protect the magnets against displacement or against corrosion by encapsulation.

SUMMARY OF THE INVENTION

The object of the present invention is that of being able to remove heat more uniformly from a rotor of an electrical machine despite simple assembly. A further object is to specify a corresponding cooling method for a rotor of an electrical machine.

According to the invention, this object is achieved by an electrical machine having a rotor which has at least one radial cooling slot, with the rotor having axially running cooling ducts which issue into the at least one radial cooling slot in said rotor, with first cooling ducts of the axially running cooling ducts running, by way of their central axis, at a different radial level relative to the axis of the rotor than second cooling ducts of the axially running cooling ducts, and with a spacer being arranged in the at least one radial cooling slot, it being possible for a first cooling stream to be conducted from one of the first cooling ducts to one of the second cooling ducts by said spacer.

The invention also provides a method for cooling an electrical machine having a rotor by cooling the rotor with a first cooling stream which is introduced axially into the rotor, with the first cooling stream having a central line which is situated at a first radial level relative to the axis of the rotor when said cooling stream is introduced into the rotor in the flow direction, and the first cooling stream being deflected to a second radial level, which differs from the first radial level, by way of its central line within the rotor.

According to the invention, the cooling stream is advantageously moved from one radial level to another radial level in the rotor. As seen in a radial section, this could also be called a change in the cooling agent planes in the rotor. This proves advantageous particularly when the rotor is heated differently at different radial levels. A cooling stream which has still absorbed little heat can thus be deflected in a deliberate manner at a radial position, at which heat has to be removed very effectively, within the rotor.

The spacer preferably has a plurality of disks which each have passage openings, with the passage openings in the disks being arranged such that they deflect the first cooling stream in the radial direction. The disks of the spacer therefore acquire an additional function in addition to that of providing a radial cooling slot: they radially deflect a cooling stream.

In a specific embodiment, only a single radial cooling slot can be arranged in the rotor. This has the advantage that magnets can be inserted into magnet pockets in the two core elements relatively easily. The magnet pockets can also be encapsulated with insulating encapsulation compound in a relatively uncomplicated manner when there are two core elements.

In a further embodiment, a second cooling stream can be introduced into one of the axially running cooling ducts and directed radially to the outside by the spacer. At the point at which the second cooling stream is directed to the outside, the first cooling stream, provided it is deflected at the radial position of the second cooling stream, can now perform its cooling tasks in a second core element, that is to say in another axial region of the rotor.

In particular, it is expedient for the first cooling ducts to be arranged at a lower radial level in the rotor than the second cooling ducts. In this case, the first cooling stream flows initially in the vicinity of the shaft, where it absorbs only little heat. After a certain axial distance, the first cooling stream, in the "unused" state, can provide a powerful cooling effect when it is deflected into the second cooling ducts.

The rotor can be excited by permanent magnets. These lead only to relatively low losses in the rotor, and therefore it is sufficient to divide the rotor into two core elements and to provide only one single cooling air slot in the center of the rotor. As a result, a rotor with permanent magnet excitation can be produced more easily. Otherwise, when the rotor is fitted with short-circuiting bars, a plurality of core elements can also be provided, it also being possible for the cooling stream to be routed through more than two different planes in the rotor.

Furthermore, a core element (which contains the first cooling ducts) can be offset in the circumferential direction relative to a core element which contains the second cooling ducts. This serves to reduce the torque ripple of the rotor and can be readily realized by a plurality of disks of the spacer since the offset generally has to be only very low. Therefore, the function of the spacer, specifically that of radial redirection, is likewise not adversely affected by the offset.

BRIEF DESCRIPTION OF THE DRAWING

The present invention will now be explained in greater detail with reference to the attached drawings, in which.

DETAILED DESCRIPTION OF THE PREFERRED EMBODIMENTS

The exemplary embodiments described in greater detail below are preferred embodiments of the present invention.

Figure 1:
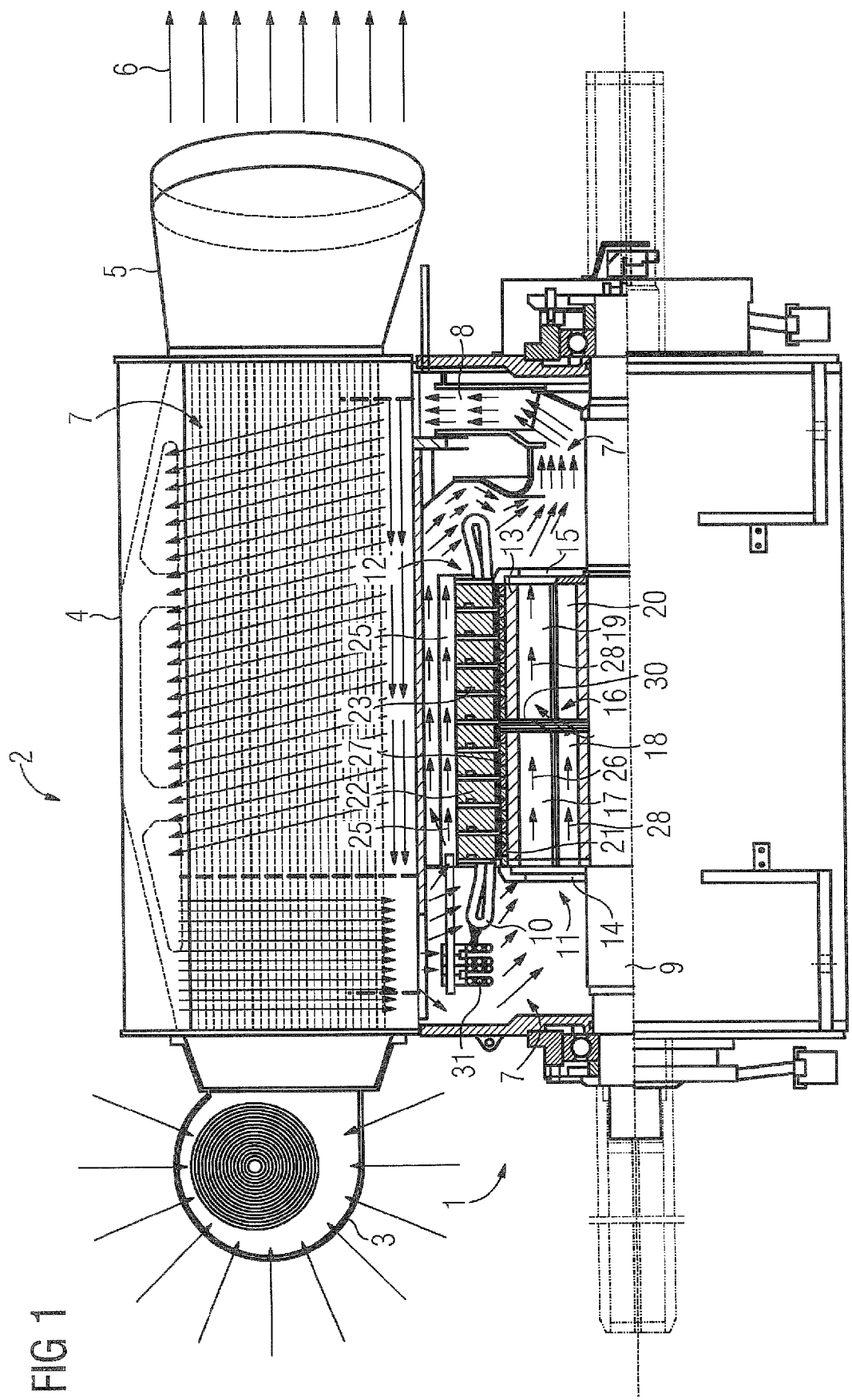
FIG. 1 shows a partial cross section through an air-cooled permanent magnet generator.

FIG. 1 shows a generator 1 having a cooling device 2. The cooling device 2 has a fan 3 for drawing in cooling air which it blows into a heat exchanger 4. The air flows from there to the outside through an outlet nozzle 5. This defines an external cooling circuit.

The heat exchanger 4 cools an internal, closed cooling circuit 7 using the external cooling circuit 6. The internal cooling circuit 7 is driven by a shaft-mounted fan 8 which is mounted on the B-side of the shaft 9 of the generator 1. The internal cooling circuit flows through the heat exchanger starting from the fan 8 and enters the winding overhang space on the A-side (drive side) of the generator. Here, said internal cooling circuit flows around the winding overhang 10 and the winding circuit 31 and then flows through the rotor 11 and the stator 12, as will be explained in greater detail below. Finally, the cooling agent (in particular air) flows through the winding overhang space on the B-side (non-drive side) of the generator and again reaches the shaft-mounted fan 8.

The rotor 11 has a laminated core 13, pressure rings 14 and 15 being mounted on the end faces of said laminated core. The rotor 11 is divided into two in its axial direction by a radial cooling slot 16. This cooling slot 16 is formed by a spacer with the disks 29 in this case.

The rotor 11 also has axially running cooling ducts, of which the axial centers lie on two coaxial cylinders. In the text which follows, the radial distance between the center axis of a cooling duct and the axis of the shaft 9 is referred to as the radial level of the cooling duct. According to the present example, the rotor 11 therefore has a (third) cooling duct 17 and radially therebeneath, that is to say at a lower radial level, a first axial cooling duct 18. A second cooling duct 19 is located on the right-hand side of the radial cooling slot 16, which divides the rotor in the middle, at the same radial level as the first cooling duct 17. A fourth cooling duct 20 is located radially beneath said second cooling duct, again at the same radial level as the second cooling duct 18. Permanent magnets 21 are arranged in the laminated core 13 in a manner distributed over the circumference in pockets which are provided specifically for this purpose. Said permanent magnets are pushed into the rotor from the two end faces and are also encapsulated from the two end faces. Since the rotor 11 has only a central radial cooling slot 16, the insertion of the magnets and the encapsulation are accordingly simple to implement.

The stator 12 has a laminated core 22 as the winding support, a large number of radially running cooling slots 23 passing through said laminated core. Axially running cooling ribs 24 are integrally formed on the outer casing of the laminated core 22. The cooling ribs 24 project in a star-like manner from the stator 12 and can be welded to the laminated core. As an alternative, each individual lamination of the laminated core 22 has radially protruding projections, so that the stacking of the individual laminations produces the cooling ribs 24.

Therefore, a stator cooling stream 25 runs along the stator casing solely in the axial direction. The axial cooling ribs 24 of the stator are effectively cooled by this stream which is supplied almost directly by the heat exchanger 4 virtually without heat absorption. This first cooling stream 25 is still used to cool the winding overhang at the B-side end.

As in the example illustrated in FIG. 1, a first cooling stream 28 is provided according to the invention, this first cooling stream flowing into the first cooling ducts 18 through the pressure plate 14 on the A-side. A spacer is located in the radial cooling slot 16 in the rotor 11. In the present example, three disks 29 are used as a spacer. The disks 29 differ and have cutouts 30 in positions which are offset in relation to one another. As a result, the first cooling stream 28 in the radial cooling slot 16 in FIG. 1 is forced upward into the second cooling ducts 19 which are located to the right of the cooling slot 16 at a higher radial level than the first cooling ducts 18. Finally, the first cooling stream 28 leaves the second cooling ducts 19 through the B-side pressure plate 15. To this end, openings are provided in the pressure plate 15, the size of said openings being such that the resistance of the first cooling stream 28 is not too low and also the second cooling stream 26 has an adequate volumetric flow rate. Downstream of the opening in the pressure plate 15, the first cooling stream 28 joins a second and a third cooling stream 26, 25 in the space in the end face of the generator 1 upstream of the shaft-mounted fan 8. The first cooling stream 28 is therefore routed in the first part of the rotor (left-hand side in the figure) through the cooler region (region close to the shaft) of the rotor. In the process, said first cooling stream absorbs hardly any heat. Said first cooling stream is then guided upward on the right-hand side of the rotor and there serves to effectively cool the rotor part on the right-hand side. The left-hand half of the rotor part is, as explained above, primarily cooled by the second cooling stream 26.

The second cooling stream 26 through the rotor is supplied by a cooling agent or cooling air which has already cooled the winding overhang 10 and the winding circuit 31 in the A-side winding overhang space. This second cooling stream 26 passes through the A-side pressure disk 14 and enters the third cooling duct 17 in the rotor 11. The second stream 26 of cooling agent is directed radially to the outside at the radial cooling slot 16 in the center of the rotor. Said second stream of cooling agent is distributed axially throughout the entire air gap 27 between the rotor 11 and the stator 12. From there, said stream of cooling agent is forced radially to the outside through the cooling slots 23 in the stator since the pressure disks 14 and 15 have a somewhat larger diameter than the laminated core of the rotor including the permanent magnets 21. The second cooling or air stream 26 is connected to the third cooling stream 25 at the outer face of the stator. The second cooling stream 26 therefore ensures that the rotor part which is illustrated on the left-hand side in FIG. 1 is cooled and that the inner part of the stator is cooled over its entire axial length. The second cooling stream 26 therefore has a substantially Z-shaped profile. It initially flows axially, then radially and then axially again. Therefore, an adequate amount of heat can be removed from the stator 12 together with the linear stator cooling stream, even if the rotor has only one radial cooling slot 16 and not a large number of such radial slots.

Figure 2:
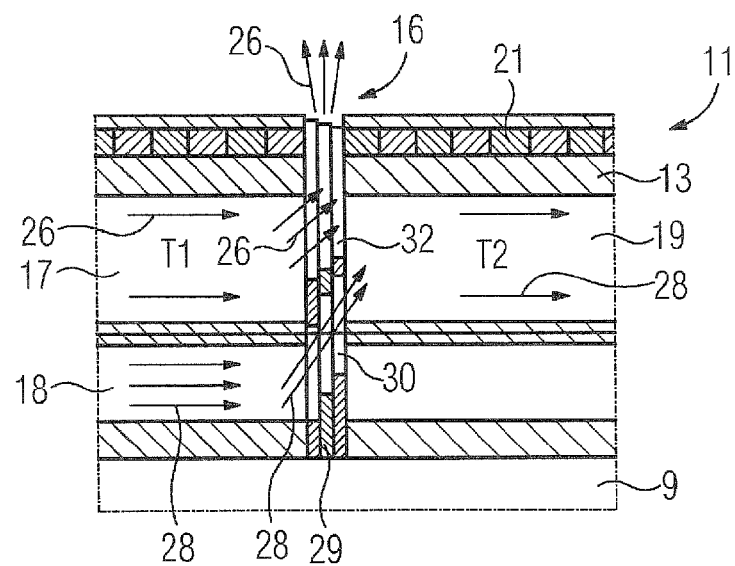
FIG. 2 shows an enlarged detail from FIG. 1 for more accurately illustrating the change in level of the cooling stream in the rotor.

The detail of the rotor 11 with the cooling slot 16 from FIG. 1 is illustrated on an enlarged scale in FIG. 2. The rotor is divided axially into two core elements T1 and T2 by the cooling slot 16. The radial cooling slot 16 is formed by the disks 29 which serve as a spacer between the two core elements T1 and T2. It is clear from the enlarged view in FIG. 2 that the disks 29 have cutouts or openings 30, and therefore a cooling stream can pass the respective disk 29. In the present case, the first cooling stream 28 passes the cooling slot 16 or the disks 29 through openings 30 from one of the first cooling ducts 18 into one of the second cooling ducts 19. The center of a respective opening 30 therefore rises in the direction of the cooling stream from one disk to the next in the radial direction. There is therefore a flow connection between the first cooling duct 18 and the second cooling duct 19.

The disks 29 have further cutouts 32 which make it possible for the second cooling stream 26, which enters the rotor through the third cooing ducts 17, to flow radially to the outside. In this case, it is advantageous, under certain circumstances, for the right-hand disk 29, which faces the second cooling duct 19, to seal off the second cooling duct 19 from the third cooling duct 17, so that the second cooling stream 26, which is generally already significantly heated when it reaches the cooling slot 16, does not enter the second cooling duct 19. Instead, the first cooling stream 28 which is routed in the first core element T1 can now cool the second core element T2 in the region of the permanent magnets 21, that is to say in the outer region of the rotor, on account of the radial change in level. In principle, the directions of flow of each cooling stream in each case in the opposite direction are of course also feasible.

Figure 3:
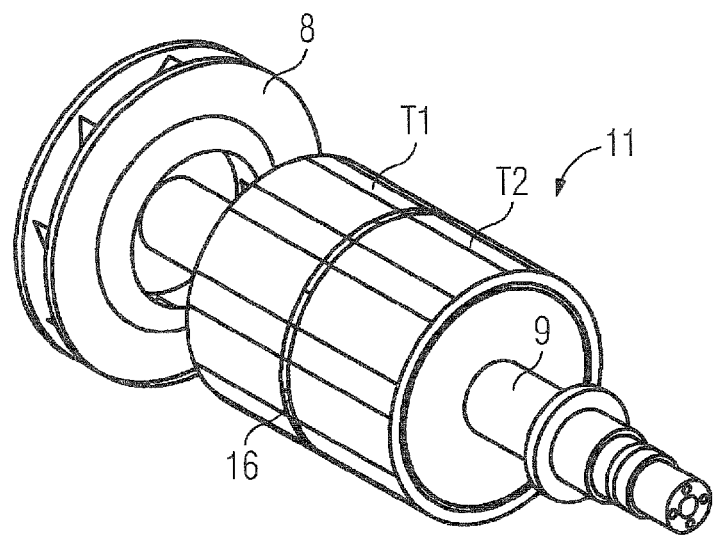
FIG. 3 shows a perspective view of the rotor from FIG. 1.
Figure 4:
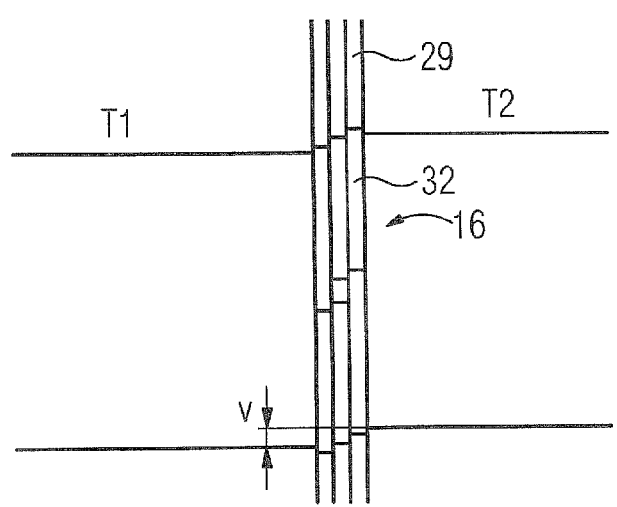
FIG. 4 shows a plan view of a detail of the radial cooling slot in the rotor from FIG. 3.

FIG. 3 additionally shows the rotor according to the invention in a perspective view. Therefore, as has already been explained in connection with FIG. 1, the shaft-mounted fan 8 is located on the shaft 9 in addition to the core elements T1 and T2 of the rotor 11 on the B-side. The core elements T1 and T2 are separated from one another by the radial cooling slot 16. The second cooling stream 26 is passed to the outside from said radial cooling slot. FIG. 3 also shows that the core elements T1 and T2 are offset in relation to one another in the circumferential direction. This offset V is illustrated on an enlarged scale in FIG. 4. The torque ripple of the rotor 11 is reduced by the offset V in the circumferential direction. Nevertheless, the cutouts 32 in the disks 29 ensure an adequate radial cooling slot.

Figure 5:
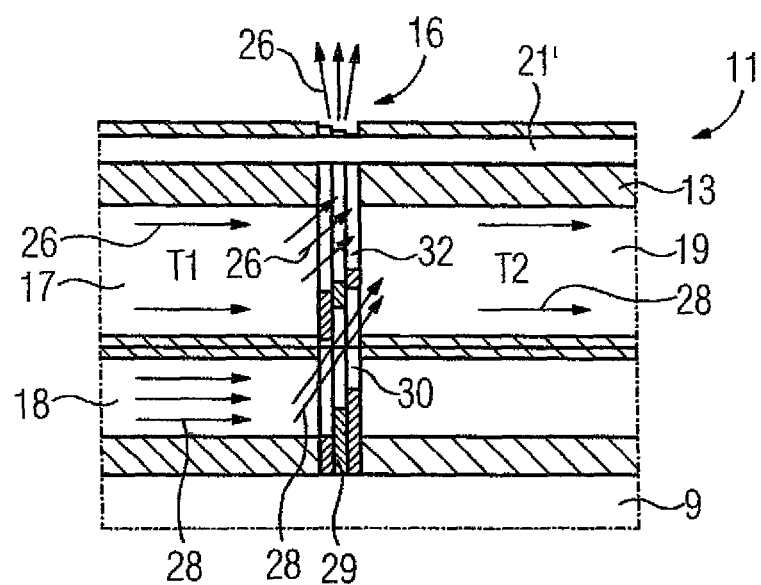
FIG. 5 shows the detail of FIG. 2 illustrating a short-circuiting bar received in the rotor.

FIG. 5 shows a cross section of the rotor 11 which substantially corresponds to the rotor shown in FIG. 2, with the difference residing in the illustration of a short-circuiting bar 21' in the rotor 11.

In summary, it has therefore been found that the invention makes it possible to ensure ventilation with two or more core elements of a rotor with permanent magnet excitation. It is also possible to supply virtually unused cooling air to the rotor over its entire length by using different cooling planes or levels. Numerous further advantages are also provided. Firstly, simple encapsulation is possible on account of it being easy to reach the pockets of the permanent magnets. This results in secure fixing of the magnets and high-quality protection against corrosion. Furthermore, the rotor pressure disks 29, which separate the core elements of the rotor from one another, can be used to ventilate the stator since they have a fan effect. According to the described design, the latching torque may optionally be lowered by offsetting the core elements. An additional advantage is provided by it being possible for the lamination sections of the two core elements to be identical.

The invention claimed is:

1. An electrical machine, comprising:
a rotor defining a rotor axis and having a single radial cooling slot to divide the rotor in midsection, said rotor including axial cooling ducts which issue into the radial cooling slot, said cooling ducts having first, second and third cooling ducts, each defined by a central axis, wherein the central axis of the first cooling duct extends in closer proximity to the rotor axis than the central axis of the second cooling duct; and
a spacer arranged in the radial cooling slot and constructed to route a first cooling stream from the first cooling duct to the second cooling duct, said spacer including a plurality of discs,
wherein a second cooling stream is introducible into the third cooling duct and directed radially to the outside by the spacer, with the third cooling duct defined by a central axis which extends coaxially to the second cooling duct,
wherein the rotor is divided into two in its axial direction by the radial cooling slot which is formed by the spacer with the discs,
wherein the discs each have a passage opening with centers rising in a direction of a cooling stream from one of the discs to a next one of the discs in a radial direction.

2. The electrical machine of claim 1, wherein the passage openings of the discs are arranged to deflect the first cooling stream in the radial direction.

3. The electrical machine of claim 1, further comprising permanent magnets which are provided to excite the rotor and which are cooled.

4. The electrical machine of claim 1, further comprising short-circuiting bars which are received in the rotor and which are cooled.

5. The electrical machine of claim 1, wherein the rotor has a laminated core comprised of a first core element which includes the first cooling duct and a second core element which includes the second cooling duct, said first core element being arranged offset in a circumferential direction relative to the second core element.

6. A method of cooling a rotor of an electrical machine, comprising the steps of:
introducing a first cooling stream axially into the rotor in a direction of a central line which extends at a first radial level in relation to an axis of the rotor;
deflecting the first cooling stream in midsection of the rotor in a single radial cooling slot in a radial direction to flow in relation to the axis of the rotor at a second radial level which is offset relative to the first radial level, which radial slot divides the rotor into two in its axial direction and is formed by a spacer with discs having passage openings with centers rising in a direction of a cooling stream from one disc to a next disc in the radial direction;
introducing a second cooling stream axially into the rotor at the second radial level; and
routing the second cooling stream radially to the outside in midsection of the rotor.

7. The method of claim 6, further comprising cooling permanent magnets provided to excite the rotor or short-circuiting bars received in the rotor.

* * * * *